(12) United States Patent (10) Patent No.: US 7,802,193 B1
McDonald et al. (45) Date of Patent: Sep. 21, 2010

(54) CONTROLLING MOTION USING A HUMAN MACHINE INTERFACE

(75) Inventors: Michael J. McDonald, Albuquerque, NM (US); T. Scott Gladwell, Albuquerque, NM (US); Robert J. Anderson, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 712 days.

(21) Appl. No.: 11/758,139

(22) Filed: Jun. 5, 2007

Related U.S. Application Data

(63) Continuation-in-part of application No. 10/324,411, filed on Dec. 17, 2002, now abandoned.

(60) Provisional application No. 60/340,876, filed on Dec. 19, 2001.

(51) Int. Cl.
*G06F 3/048* (2006.01)
(52) U.S. Cl. ...................................... 715/757; 715/848
(58) Field of Classification Search ................. 715/757, 715/848, 751, 811
See application file for complete search history.

(56) References Cited

U.S. PATENT DOCUMENTS

| | | | |
|---|---|---|---|
| 5,581,666 | A | 12/1996 | Anderson |
| 6,038,074 | A | 3/2000 | Kitaguchi et al. |
| 6,535,793 | B2 | 3/2003 | Allard |
| 6,642,922 | B1 | 11/2003 | Noda |
| 6,845,297 | B2 | 1/2005 | Allard |
| 2004/0101161 | A1 | 5/2004 | Roh et al. |

OTHER PUBLICATIONS

Shapiro, et al., "3D Motion Recovery via Affine Epipolar Geometry", Intl. Jrnl. of Computer Vision, vol. 16, pp. 147-182, 1995.
McDonald, "Active Research Topics in Human Machine Interfaces", Sandia Report, SAND2000-2779, Dec. 2000.
Zhuang, et al., "Camera-Aided Robot Calibration", CRC Press, 1996, pp. 11-14 and 64-75.
Winograd, et al., "Bringing Design to Software", ACM Press 1996.
Sandia Corporation, "Sandia Software Makes Bomb 'bots Smarter", News Release, Jul. 2, 2001, downloaded from the internet at http://www.sandia.gov/media/NewsRel/NR2001/bombbot.htm on Dec. 3, 2002.
REMOTEC Inc, "EOD, Surveillance, Security and Hazardous Material Robots", downloaded from the internet at http://www.army-technology.com/contractors/mines/remotec on Dec. 3, 2002.
Small, et al., "Graphical Programming of Telerobotic Tasks", ANS 7th Topical on Robotics and Remote Systems, Augusta GA, Apr. 1997.

*Primary Examiner*—Namitha Pillai
(74) *Attorney, Agent, or Firm*—William R. Conley (57) ABSTRACT

Machine motion is directed using a graphical interface by establishing an icon in an image, displaying the icon in images having perspectives such that the icon is rendered in a corresponding relative position in the second images and moving the icons in the second images when the icon is moved in the first image, the movement being constrained along a line projected from a camera point associated with the first image and a target destination. Actions are defined using the icon and a set of action descriptors. The dominant motion space is constrained to a spherical coordinate frame centered on a vision locus and machine motions are mapped to coincide therewith based on a graphical interface view.

17 Claims, 9 Drawing Sheets

CONTROLLING MOTION USING A HUMAN MACHINE INTERFACE

RELATED APPLICATIONS

This application claims priority under 35 U.S.C. §119(e) of U.S. Provisional Application 60/340,876 filed on Dec. 19, 2001, the entire content of which is herein incorporated by reference. This application is a Continuation In Part of U.S. application Ser. No. 10/324,411 filed on Dec. 17, 2002, now abandoned, the entire content of which is herein incorporated by reference.

FEDERALLY SPONSORED RESEARCH

The United States Government has rights in this invention pursuant to Department of Energy Contract No. DE-AC04-94AL85000 with Sandia Corporation.

FIELD OF THE INVENTION

The present invention relates to control of motion using a Human Machine Interface (HMI). In particular, the present invention relates to directing a virtual, robotic, or machine element's motion directly through a graphical human machine interface.

BACKGROUND OF THE INVENTION

Human Machine Interfaces (HMIs) for intelligent machines and robots is an active research topic with literally hundreds of papers on the subject. An overview of the field including related references is provided in M. McDonald, "Active Research Topics in Human Machine Interfaces", Sandia Report, SAND2000-2779, December 2000, which is herein incorporated by reference in its entirety. A significant branch of the Human-Computer Interface (HCI) design community outside HMI is focused toward studying user needs within an ethnographic context as described in texts including for example, "Bringing Design to Software" by Terry Winograd, ACM Press, New York, N.Y., 1996, ISBN: 0201854910, which is herein incorporated by reference in its entirety. However, relatively little research or development has been done to apply HCI user studies and ethnographic techniques to Human Machine Interfaces.

After analyzing several human machine interfaces on typical existing robot systems against a variety of user needs, it can be seen that most human machine interfaces lack a strong concept of user tasks and do not adequately draw on notions that are familiar to the community of users of robotic equipment for task handing such as robot handlers in the bomb squad user community and the like.

Within the bomb squad and crime investigation communities, for example, user processes or tasks are typically defined in terms of overall task requirements. For example, bomb squad responders often describe situations and develop conceptual solutions to their problems in terms of sketches prior to performing actual bomb retrieval and disposal operations. Homicide investigators likewise use sketches at crime scenes to generate and test crime theories so that they can both better organize the evidence that they collect and explore theories that help them better identify which evidence is worth collecting. Finally, these sketches of task plans are often used to communicate and develop best practices for subsequent training activities.

Modern HMIs do not accommodate typical practices such as task orientation and sketch generation, and often the HMI imposes a layer of complexity between actually performing the task and controlling robotic, machine and/or virtual object motion.

It would be desirable therefore in the art for a method and apparatus for allowing robotic, machine and/or virtual object motion to be mutually and directly controlled by practices already employed by those charged with accomplishing tasks using virtual environments, robots or machines.

SUMMARY OF THE INVENTION

In accordance with the present invention, the deficiencies in prior systems are overcome as described below and in the Detailed Description.

Accordingly, the invention improves on the prior art by providing a method for establishing the position of an icon in a 3D environment, the method comprising the steps of: establishing an icon in a first view of the 3D environment, wherein the first view is centered at a viewpoint; displaying the icon in a second view having a second perspective such that the icon is rendered in a corresponding a 3D position of the icon as viewed in the second view; defining a polar coordinate system having three axes centered at the viewpoint, wherein a first axis and a second axis is displayed in the first view and a third axis constrained to a radial direction is displayed in the second view; and moving the icon, wherein movement of the icon is constrained to the first axis and second axis in the first view and the third axis in the second view.

Further, the invention provides a method for directing motion of an element in 3D environment using a graphical interface, the method comprising the steps of: establishing an icon in a first view of the 3D environment, wherein the first view is centered at a viewpoint; displaying the icon in a second view having a second perspective such that the icon is rendered in a corresponding a 3D position of the icon as viewed in the second view; defining a polar coordinate system having three axes centered at the viewpoint, wherein a first axis and a second axis is displayed in the first view and a third axis constrained to a radial direction is displayed in the second view; moving the icon, wherein the movement of the icon is constrained to the first axis and second axis in the first view and the third axis in the second view; and moving the element in the 3D environment by applying an action command to the icon.

Additionally, the invention provides a Human Machine Interface (HMI) for directing motion in a 3D environment using a graphical interface, the HMI comprising: a display for displaying an icon in a first view and second view of the 3D environment; an input device for placing the icon in the first and second views and moving the icon along principal axes of the 3D environment; and a processor coupled to the display and input device configured to: generate the first view centered at a viewpoint and the second view that has a second perspective such that the icon is rendered in a corresponding 3D position of the icon as viewed in the second view; and define three principle axes of the 3D environment including a first axis and a second axis centered at the viewpoint and displayed in the first view and a third axis in a radial direction centered at the viewpoint and displayed in the second view, wherein movement of the icon is constrained to the first axis and second axis in the first view and the third axis in the second view.

BRIEF DESCRIPTION OF THE DRAWINGS

A more complete understanding of the present invention will become apparent from the following description taken in conjunction with the accompanying drawings, wherein.

DETAILED DESCRIPTION

Aspects of the invention are disclosed in the accompanying description. Alternate embodiments can be devised without departing from the spirit or the scope of the invention. Further, those skilled in the art will appreciate that well-known systems and methods will not be described in detail herein.

Although the following description is made with reference mainly to a robotic device, those skilled in the art will appreciate that the present invention can be used with any machine or virtual system that can be moved in at least three dimensions.

A method and apparatus are described whereby in simply stated terms whereby a user can interact with a graphical HMI interface (e.g., containing sketches, views, 3D CAD elements, images, and the like) to direct motion and task accomplishment associated with a robot, machine or virtual device. An operator can, for example, modify pre-built sketches representing best practices into sketches describing a current situation. In accordance with various exemplary embodiments of the present invention, icon or sketch element placement can be constrained with respect to camera perspective (e.g., a camera centric coordinate system), wherein the placement and motion of the icon is constrained to certain motions depending on the view. Robot commands can be represented as sketch elements, which form nouns, and action menu commands that form verbs. Such high-level interface technologies can be merged with teleoperation modalities, using, for example, a sketch notebook to inform and preprogram sketch sequences that execute programs.

Figure 1:
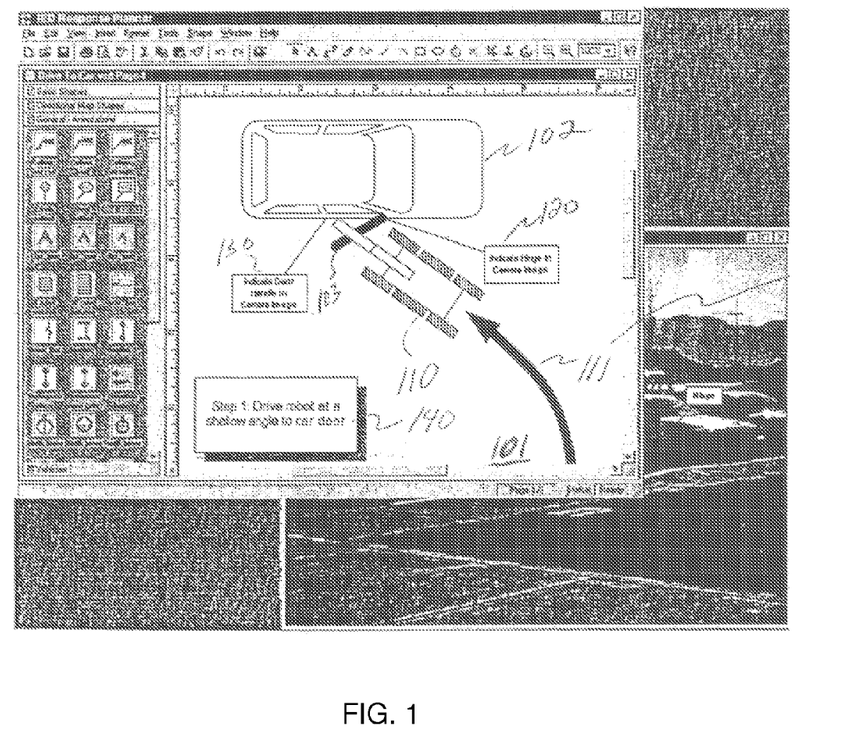
FIG. 1 is a diagram illustrating an exemplary sketch interface in accordance with various exemplary embodiments of the present invention.

In accordance with various exemplary embodiments of the present invention, an operator can modify pre-built sketches representing best practices into sketches describing the current situation. For example, part of a task sketch for retrieving a car bomb might include a task step sketch for opening the car door. Accordingly, the program can be in the form of a graphic representation of the relevant objects (e.g., car, car door, robot, gripper, and the like) and motions (e.g., move robot to door, position gripper, and the like) to accomplish the task, such as shown in FIG. 1. In operation, the user can overlay this sketch upon an image taken from an appropriately calibrated camera and then modify this sketch to match the real robot and door positions. Several additional features can be incorporated into a HMI for controlling a robot to perform tasks as will be described in greater detail hereinafter.

Thus in accordance with various exemplary embodiments of the present invention, an exemplary implementation as shown in FIG. 1, allows a user of interface 100, through viewing screen 101, to interact with, for example, machine 110 using plan views. Drawings of car 102, robot or machine 110, and door 103, for example, describe environment, and arrow 111 and blocks 120, 130, and 140 describe action to be applied. This sketch view can be used as a first level for planning the action of the robot and replicates how an individual can plan a task.

Figure 2A:
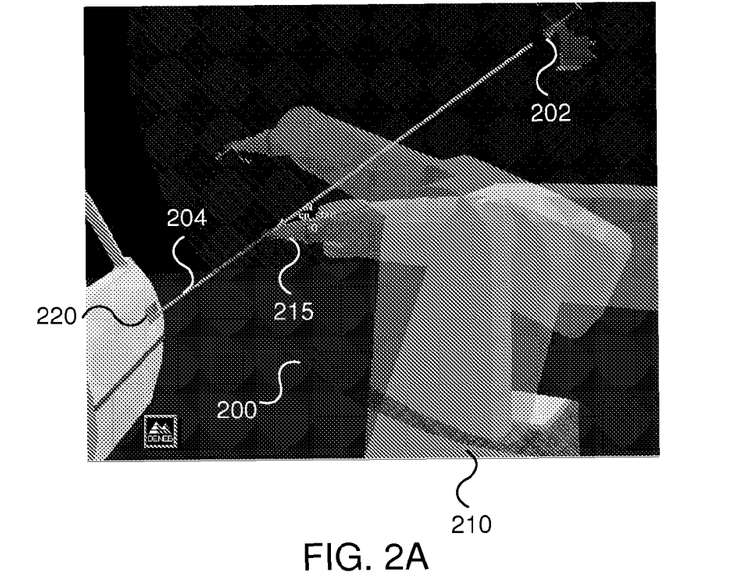
FIGS. 2A-B are illustrations of the spherical coordinate system and motion in the system.
Figure 2B:
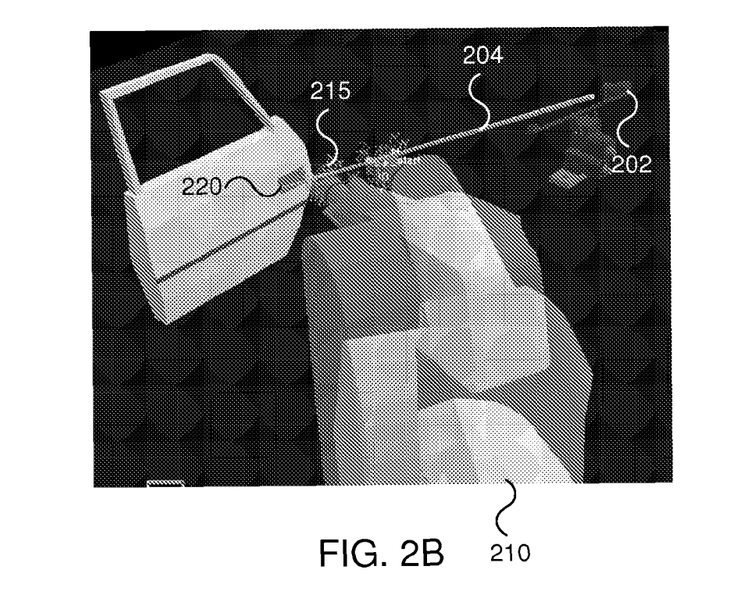

FIGS. 2A-E illustrate the same basic concepts relative to a camera (view) centric coordinate system and constrained movements in the different views. Referring to FIGS. 2A and 2B, a robot arm 210 is shown. A spherical coordinate system 200 is defined that has its center at the camera viewpoint as viewed from camera 202. Line 204 projects radially from the center of spherical coordinate system centered at the camera viewpoint to the door handle 220. FIG. 2A shows a perspective view of the tool 215 being moved along the sphere in X and Y in the primary camera view from a point outside the line 204 to a point on the line 204 (i.e., aligning the tool 215 with the door handle 220 in the first view). FIG. 2B shows a perspective view of the tool 215 being moved radially (i.e., along line 204). The robot arm's 210 dominant motion coordinate frame is constrained to be along a spherical coordinate frame that is centered on the camera 202. The tool 215 moves analogously to active sketch icons in the HMI.

Figure 2C:
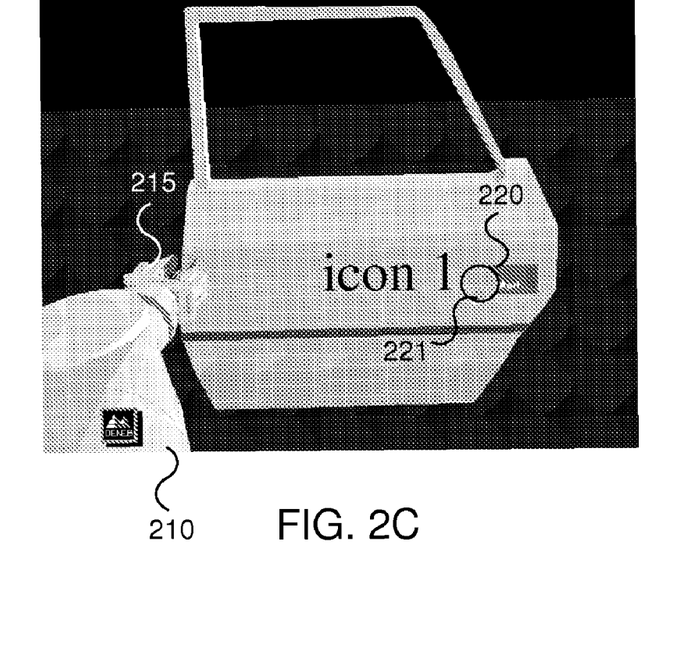
FIGS. 2C-D are illustrations of icon placement in the system in accordance with the present invention.
Figure 2D:
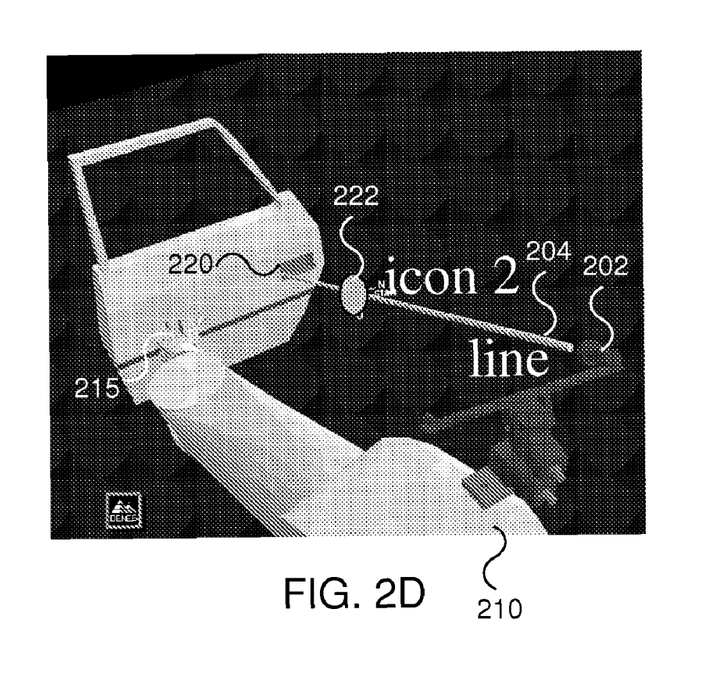

As shown in FIGS. 2C and 2D, two perspective views are shown. FIG. 2C shows the view from camera 202. FIG. 2D shows a camera view including a line 204 in space (i.e., the epipolar line). The mathematics for constructing this line 204 is well known in the art. Every time the user moves icon 221 in the first view, as shown in FIG. 2C, the present invention computes this line 204 as it would be rendered in the second image, as shown in FIG. 2D. The present invention uses this line 204 to constrain the position and movement of the icon 222 in the second view. A 3D position of icon 221 and related icon 222 is computed from the intersection of lines projected from the two views, as is well known in the art. Dragging icon 222 causes it to move along the line 204. Dragging icon 221 causes icon 222 to move at a constant distance from camera 202 (i.e. at a constant radial distance). Consequently, the icon movement is constrained to move in a predetermined manner in the perspective views.

Constrained drawing in an image perspective involves using two or more viewpoints, which directly map to camera-based images and a machine, robot, or virtual object position. In the system, two or more camera images are gathered with calibration data defining the image point of origin. Those skilled in the art will appreciate that using calibrated cameras to establish positions in a field of view is well known in the art and used in other fields such as photogrammetry, visual targeting, and the like. An example of using camera-based images to map robot position is described in Zhuang, H. and Roth, Z., "Camera-Aided Robot Calibration", CRC Press, 1996, pages 11-14 and 64-75, which is herein incorporated by reference in its entirety. Since the subject of using camera-based images to map robot or machine position is well known to those skilled in the art, the details of these methods will not be addressed in detail herein.

A mathematical correspondence or correlation using the calibration data is established so that each point or pixel in one camera image projects as a line or curve in the other images. When a user, for example, creates an icon in one camera image/view, one or more corresponding icons appear in other images/views.

The icon placement in the second image/view can be determined by a number of techniques as will be appreciated by those skilled in the art. For example, a user clicks on image in first screen to place an icon. Then, an initial position for the corresponding icon is generated by placing the icon in 3D position at an appropriate default radius from the base location (i.e., viewpoint at which the coordinate system is centered) of the camera used to create the first image. In one embodiment, the initial radial placement of the icon in the second view is determined from the first camera, wherein the initial placement roughly corresponds to the distance from the camera to the middle of the robot's work envelope. Alternative initial icon placement techniques in the second image include but are not limited to: 1) using the viewing parameters from the second camera to set the placement of the icon so that the icon would naturally show up toward the center of the second image; and 2) using the radial distance of recently placed icons to place the new icon. However, regardless of how the icon is placed in the second image, the user can readily adjust the icon position along the radial axis in the second image to rapidly achieve the desired placement of the icon.

Further, when one icon is moved to any position, the corresponding icons in the other views are moved and constrained to move along the line or curve projected from the first camera viewpoint. This constrained relationship simplifies the process of defining 3D locations from two 2D image viewpoints.

Figure 2E:
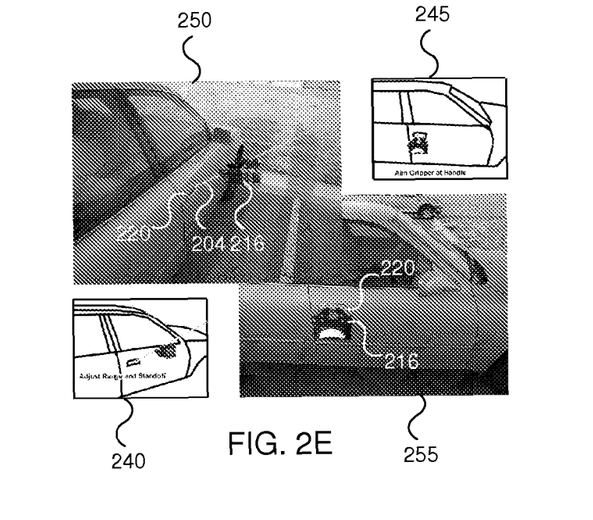
FIG. 2E is diagrams further illustrating an exemplary sketch interface in accordance with various exemplary embodiments of the present invention.

As shown in FIG. 2E, the user "aims" the gripper icon 216 at an object (e.g., door handle 220) through one camera then watches closure in the other. Moving radially in and out keeps gripper icon 216 centered over the object in a primary view 255 as it moves toward the target in the secondary view 250. The camera base position need be only roughly defined to provide reasonably predictable motion. Sketches 240 and 245 with corresponding camera views 250 and 255 are shown. Such an implementation builds on visual based positioning described above. Target and range concepts can be applied to, for example, the opening of car door 220. Accordingly, the gripper icon 216 can be directed along line 204 established as a constrained motion path for the gripper icon 216 in view 250 and ultimately tool 215 (not shown), to move to and operate door handle 220.

Once coarse tasks or goals are accomplished, fine resolution actions can be defined. Thus, opportunities for user input need to be transformed into meaningful sketching actions. For example, one aspect involves a user clicking the same point in two images in order to define a 3D point. Within a sketch context, the clicks are broken into a targeting action, e.g. moving an icon to show where a gripper might touch, and a ranging action, e.g. moving an icon to show how close the tool/gripper should approach.

Geometry and action commands can be used to establish direct relationship between sketch elements and robot/machine/virtual object motions in the HMI. For example, points, lines, and other geometric entities (nouns) can be used to directly define robot motions in the robot's tool frame via a set of action commands (verbs). To command the motion, a user can select a geometric entity and then an action verb. For example, selecting a point and the action verb "move to" can generate a robot motion command to move the robot's tool to the point's 3D position. Selecting a directed line and the action verb "move" can generate robot motion command to re-orient the robot's tool according to the orientation of the line and move the robot's tool to the line's base.

Seamless transition from command level to teleoperation can further be accomplished by merging high-level or supervisory control with traditional telerobotic control inputs. With the addition of teleoperation input devices, motions requiring a high degree of specification (e.g., defining a grasp point) can be defined through the sketch (HMI) interface. Motions requiring coarse specification (e.g., loosely positioning the robot before moving into grasp position) or fine tuning (e.g., finely modifying a grasp point) can be quickly defined through telerobotic/teleoperation also using the HMI interface. As will be appreciated by those skilled in the art, the term teleoperation is used herein to refer to the individual operation of joints, arm segments, and the like, whereas telerobotic refers to higher level commands for movement. For example, in telerobotic operation a robot tool is moved from one position in space to another using computer assistance to appropriately move the joints and the like to achieve the desired motion.

Figure 3:
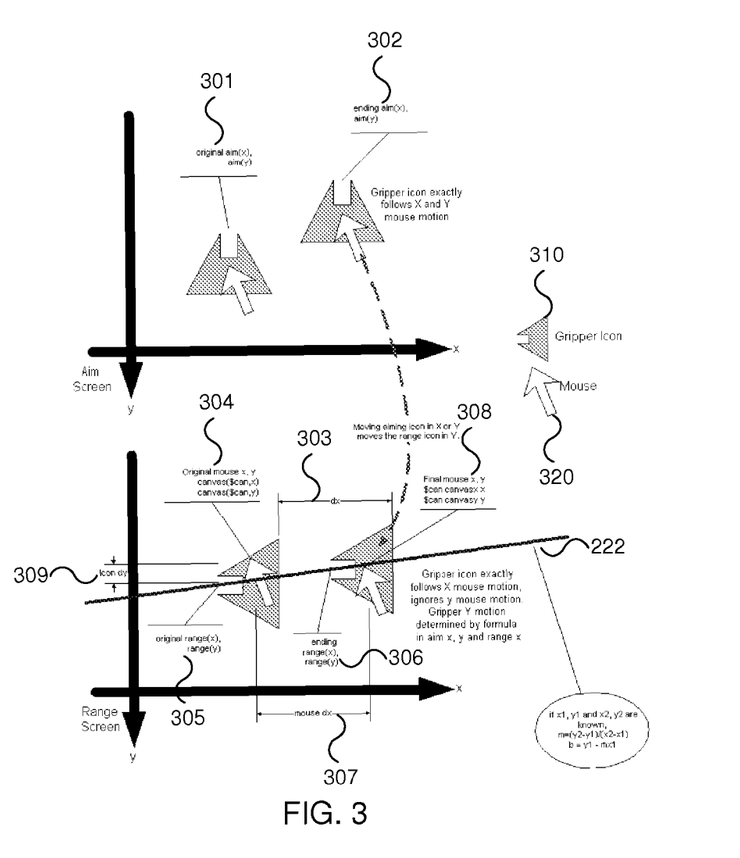
FIG. 3 is a diagram illustrating mathematical relationships between an aim icon and a range icon in accordance with various exemplary embodiments of the present invention.

A visualization of the gripper movement is shown in FIG. 3. Using, for example, a mouse controlled cursor 320, and an abstracted gripper icon 310, the movement of the actual gripper (not shown) can be controlled through "aim" and "range" control movements. As can be seen in the aim screen, gripper icon 310 can originally be located at point 301 having coordinates original aim(x), aim(y). Using mouse-controlled cursor 320, gripper icon 310 can be moved in both x and y directions to point 302 end aim(x), aim(y). The icon movement is then used to aim the actual gripper (e.g., align over door handle). Such movements of the icon 310 in the aim view result only in y direction movement of the icon 310 in range view according to the mathematical relation between aim(x), aim(y) and range(x).

However, those skilled in the art will appreciate that this is merely an illustration of the movement in the virtual views shown. In alternative views such as that shown in FIGS. 2A-E, movement of the icon in the first view (e.g., FIG. 2C) will cause relative icon movement in both axes of the second view (e.g., FIG. 2D).

Once aimed, movement of mouse-controlled cursor in the range screen causes movement of gripper icon 310 in the range(x) direction, as shown in the lower portion of FIG. 3. For example, gripper icon 310 can start at original position 305 having coordinates range(x), range(y). The movement from position 301 to position 302 in the aim screen, results in the icon movement dy 309 in the range screen. Then the movement of the mouse from point 304 to point 308 results in a mouse movement of mouse dx 307 in the x direction of the range screen (i.e., the axis the icon movement is constrained to). Therefore, the icon 310 moves in corresponding distance dx 303 that results in an ending position 306 having coordinates of ending range(x), range(y). Accordingly, the final position of the icon 310 is at point 302 in the aim screen and point 306 in the range screen, which corresponds to a single 3D position in the environment (e.g., at a door handle).

Therefore, according to one embodiment of the present invention, a method for establishing the position of an icon in a 3D environment can be described. The method comprises establishing an icon in a first view 255 of the 3D environment, wherein the first view is centered at a viewpoint. The icon 216 is displayed in a second view 250 having a second perspective such that the icon 216 is rendered in a corresponding a 3D position of the icon 216 as viewed in the second view 250. Three principle axes are defined including a first and second axis centered at the viewpoint and displayed in the first view 255 and a third axis centered at the viewpoint constrained to a radial direction and displayed in the second view 250. The icon 216 moves along the principal axes, wherein the movement of the icon 216 is constrained to the first axis and second axis in the first view 255 and the third axis in the second view 250.

The present invention can incorporate additional views (e.g., additional cameras). Each additional view constrains icon movement in the radial direction centered at the viewpoint from the first view (i.e., the first camera). As described above, moving the icon in the second view or one of the additional views can refine the radial position of the icon. However, moving the icon in the radial direction (e.g., along the third axis) does not move the icon as viewed from the first view (e.g., 255). Those skilled in the art will appreciate that any appropriate input device can be used for positioning of the icon, such as shown in FIG. 3.

Further, as shown in FIGS. 2A-E, the icon can represent an element of a robotic arm. However, the present invention is not limited to robotics, and the icon can represent any machine that can move in at least three axes or even a virtual object that is movable in at least three axes in a 3D environment.

Accordingly, in another embodiment of the present invention, a method for directing motion of an element in 3D environment using a graphical interface can be realized. The method comprises moving the element in the 3D environment by applying an action command to an icon or icons, which are positioned as previously described in the method above. That is to say that the icon can be positioned to a desired point using the above-described method and an action command can be applied to the icon that results in the corresponding movement of the robot, machine or virtual object. Those skilled in the art will appreciate that many systems exist for moving specific elements (e.g., robot gripper) to specific positions once the position is defined (e.g., move absolute commands, move relative commands and the like). Therefore, since the present invention allows for the placement and refinement of icons representing robotic elements, machines or virtual objects in a 3D environment, the position of the icon can be used to program the appropriate move of the controlled device (e.g., moving the gripper to a door handle).

The above-described concept can be extended to provide various sketch-oriented actions to develop a task solution such as, for example, opening doors. A conventional interface for having a robot open a door involves a user selecting an "open door" operation, bringing up relevant camera images and indicating (e.g., using a mouse click) various door features that the system planner needs to generate a path that allows the robot to reach out and open the door. In accordance with exemplary embodiments of the present invention, a sketch of a door opening can be presented to a user, whereupon the user can move the sketch elements as icons on top of the camera images. Because the robot goal positions are directly specified, the planner requirements are simplified and robot motions are more easily predicted and controlled by the operator.

Camera Coordinated Motion can be used to generate or constrain robot trajectories by introducing a camera frame coordinate space constraining the robot's dominant motion coordinate frame to be along a spherical coordinate frame centered on a camera, such as shown in FIGS. 2A-E. Robot motions accordingly mimic the same basic constraints as the icons in the sketch based interface (i.e., the HMI of the present invention). For example, mapping the tilt and pitch of a joystick to drive a robot's tool along the longitude and latitude of the sketch interface coordinate frame causes the robot's tool to move in the same way in the constrained camera's image frame as the aim icon moves in the sketch interface. Mapping, for example, the z hat buttons, joystick twist, or other auxiliary axis input depending on the joystick to the coordinate frame's radius makes motions in any other camera view mimic the motion of range icons in the sketch interface. Through such a mapping, the same mathematics that are used to speed icon-based selection in the sketch interface can be used to speed teleoperation/telerobotic operation.

Figure 4:
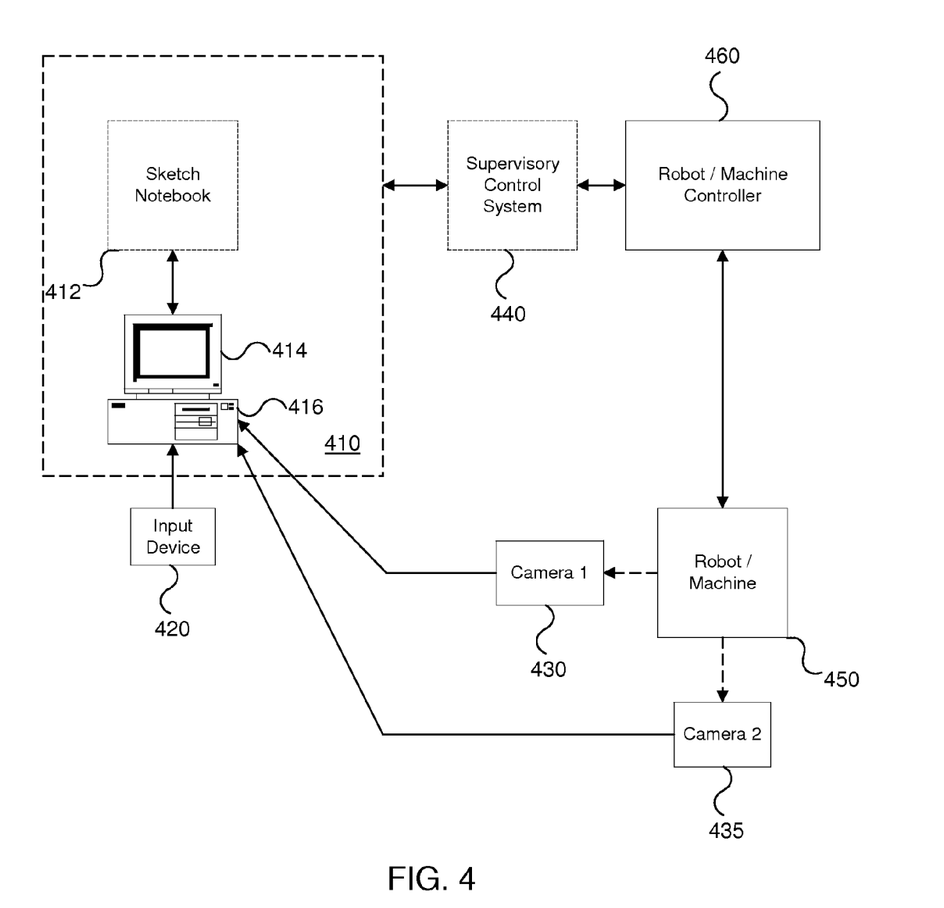
FIG. 4 is a block diagram of an exemplary sketch system in accordance with various exemplary embodiments of the present invention.

Referring to FIG. 4, a block diagram of an exemplary system according to the present invention is shown. Seamless transition from command level (i.e., icon placement and action commands) controlled by the HMI/sketch control system 410 to teleoperation trajectories with velocity override can be accomplished by providing real time user control over commands generated from a high-level or supervisory control system 440. Those skilled in the art will appreciate that the supervisory control system can be a separate system or integrated into the HMI/sketch control system 410. Commands are sent to the robot 450 via controller 460 as trajectories with user-controlled velocity in the teleoperation mode. An input device 420 having at least two linear or three digital degrees of freedom (e.g., three buttons, a lever-dash pot, or one axis of a joystick, and the like) is used to control elements of robot 450, such as tool tip velocity, along and perpendicular to the commanded trajectory. From a user perspective, the input device 420 (e.g., buttons, joystick, mouse) controls closure speed toward goals (targets) and provides an ability to quickly approach or back away from goals. As previously described image acquisition devices 430 and 435 (e.g., cameras, computer generated virtual views, scanning devices, and the like) provide images that are used by the sketch control system to establish the views for placing icons and directing motion.

Additionally, the image acquisition devices 430, 435 provide visual feedback of robot/machine/virtual device 450 to the user for use in the teleoperation and telerobotic modes. With this simple control, a user can loosely or inaccurately specify a high-level goal through the sketch interface 410, and then gracefully stop robot motion if it reaches a satisfactory goal before the motion is complete. In addition, the ability to move along the automatically generated trajectory with a negative velocity gives a user the apparent ability to back up. The ability to "back up" is important, for example, in grasping tasks where the robot starts from a position above an object and moves down to grasp the object. Here, the user can fine-tune the grasp, close the gripper, and then use the back up feature to automatically back up along the approach path to retrieve the object. Finally, the additional joystick degrees of freedom (DOFs) can be used to drive the robot perpendicular to the line of motion. This additional control allows the user to seamlessly adjust the robot's motion without redefining the main path.

Accordingly, an aspect of the present invention provides for a Human Machine Interface (HMI) for directing motion in a 3D environment using a graphical interface. The HMI comprises a display 414 for displaying an icon in a first view and second view of the 3D environment. An input device 420 is used to place the icon in the first and second views and move the icon along principal axes of the 3D environment. A processor 416 is coupled to the display 414 and input device 420. Those skilled in the art will appreciate that the processor as used herein refers to any device capable of performing the operations defined above and includes but is not limited to software, programmed general purpose computing systems and specialized hardware such as ASICs, PGAs, discrete logic components and the like. The processor 416 is configured to generate the first view centered at a viewpoint and the second view that has a second perspective such that the icon is rendered in a corresponding 3D position of the icon as viewed in the second view. Further, the processor 416 defines the three principle axes of the 3D environment including a first axis and a second axis centered at the viewpoint and displayed in the first view and a third axis centered at the viewpoint constrained to a radial direction and displayed in the second view.

Additionally, the HMI described above can be used to move an element (e.g., robot tool) in the 3D environment by applying an action command to the icon. For example, the processor 416 generates the appropriate control commands to move the element in response to the action command. Those skilled in the art will appreciate that the commands generated by the processor 416 can vary depending both on the element controlled and the type of action applied. For example, assuming the configuration shown in FIG. 4, the processor might only generate a 3D position as a command and provide that position as "move to" command to controller 460 that then converts the command to the necessary velocity and trajectory commands that actually controls the robot/machine 450. Alternatively, if the HMI is being used with user control of the velocities the processor 416 or a supervisory control system 440 can determine the trajectory and velocity movements directly and transmit these commands to the controller 460. However, if the element being controlled is a virtual object, then the commands can be implemented by the processor 416 without any additional interface to an auxiliary controller/control system that would control real world devices such as motors, actuators, solenoids, valves and the like for actually moving the robot/machine 450.

A sketch notebook 412 can be used as basis for task reuse and communication of best practices or standardized conduct or operations. The sketch notebook 412 is a storage system for storing the tasks that are implemented according to the previously described methods. Complete generalized robot tasks can be described as drawings that overlay predetermined camera images/views and corresponding sketch elements (e.g., icons, lines) annotated with descriptive text indicating how the sketch elements can be used. Sketch notebooks can further be used as basis for standardizing procedures, organizing casebooks of best practices, or communicating and simplifying standard conduct of operations guidelines. For example, the task of grasping a cylinder can be stored and displayed as a general image of a cylinder overlayed with a directed line placed over the cylinder's centerline and a text annotation explaining the sequence of menu commands needed to grab the cylinder, e.g., 1: select line then do action align gripper; 2: with line still selected, do action grasp. Instructions can have active sketch elements to further simplify the user process of adapting the pre-stored plan to a current configuration.

Referring to FIG. 4, the processor can be a PC running Windows 2000, for example. The input devices can be mice and USB joysticks. The software in processor includes software programmed in accordance with the foregoing description of the present invention. The supervisory control system can use suitable control code, such as patented by Robert Anderson in U.S. Pat. No. 5,581,666 "Modular Architecture for Robotics and Teleoperation" by Robert Anderson, which is herein incorporated by reference in its entirety. Examples of controllers and robots include a Staubli branded Adept controller, a Staubli robot and a Remotec Wolverine robot.

The present invention provides a HMI that operates as a high level control to the underlying systems that implement the robot/machine motion. Particularly, the method of icon placement and constrained movement of the icon in the first and second views allows a user to rapidly position the desired element (e.g., gripper) in relation to an object (e.g., door handle) on which the element is going to act, as has been described in detail in the foregoing description. Once the position of the icon is established by the user, the 3D coordinates can easily be calculated as will be appreciated by those skilled in the art. The 3D coordinates can then be passed along with the desired action (e.g., "move to" the 3D coordinates) applied to the icon to instruct the system of the desired action and position. Those skilled in the art will appreciate that the specific interface will vary based upon specific hardware configurations (e.g., robot, robot controller, supervisory control system, and the like). However, the actions associated with the tasks typically do not change (e.g., move gripper to door handle, grip door handle, open door). Accordingly, the present invention allows users with limited technical skill to operate sophisticated machines and perform sophisticated operations, via an intuitive HMI.

Those skilled in the art will appreciate that the forgoing components and description are provided for illustration purposes only and not for limitation, as the present invention is applicable to any robot, machine or virtual element that can be moved in at least three dimensions.

Figure 5:
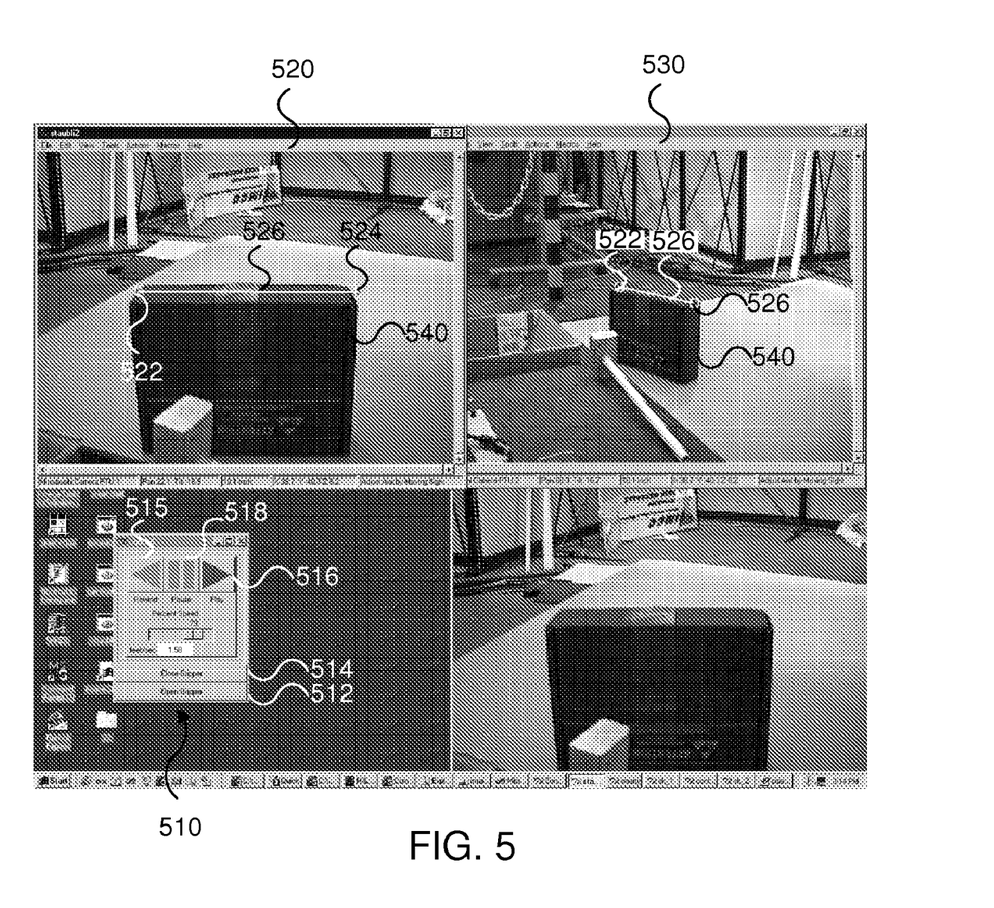
FIG. 5. illustrates another aspect of the present invention that uses a VCR type interface to execute motion commands.

FIG. 5 illustrates another aspect of the present invention that uses a VCR type interface to execute motion commands. Implementation of the control can be directed via joystick or other multi-DOF input device. As shown in FIG. 5, the VCR type control 510 becomes active when a task commanded. The VCR forward/play button 516 is used to step the robot through commanded motion. The VCR backward button 515 allows the robot to retract. The pause button 518 can be used to stop the movement. The concept is to use the VCR control (i.e., forward/backward) to control direction and the speed function can be controlled a joystick or the like. Additionally, the VCR control can provide auxiliary control buttons directed to specific functionalities of the device being controlled. For example, the open gripper 512 and close gripper 514 buttons can be used to open and closed the robot gripper. Those skilled in the art will appreciate that this implementation of the VCR type control still relies on the previously developed HMI methods described above. For example, views 520 and 530 relate to the first and second view. Icons 522 and 524 are used to define line 526. The icons 522, 526 and line 526 are shown in both the first view 520 and the second view 530. The user can easily adjust the line 526 to box 540 by moving the icons 522 and 524 in the constrained axes in the respective views, 520 and 530. Once the line is defined the VCR control 510 can be used to move the robot gripper (not shown) to the box 540 and orients the gripper to line 526 by applying the appropriate action commands to the line 526 and activating the forward/play button 516.

Using an exemplary system in accordance with the present invention, a user can select a task requiring 3D point information and then provide the 3D data through the HMI by setting aim and range icon pairs as described in the first and second views, respectively. Accordingly, the user can select, for example, a "pick up pipe" task and indicate the center point and orientation of the pipe by moving two aim and range icons to either end of the pipe. The system then moves the robot above a point half way between the two end points, orient itself along the axis, then move down and pick up the pipe. Interacting with dedicated aim and range icons in this manner significantly reduces operator work and cognitive load with a result of speeding the task of identifying features from a visual scene. It is noted that such an implementation requires the user to specify geometric elements needed by a planner to convert geometric information into robot plans. It becomes apparent that a paradigm shift from model-based interaction to action-based interaction can be supported.

The primary function of the visual interface historically has been to specify models of the objects that a robot would interact with. For example, in the pick up pipe task above, a user specified where the center of the pipe was and a planner generated the motion needed to move to that centerline. That is, the user sketched the pipe and the planner determined what to do with it. Two key developments over such a model are shown in the use of, for example, arrow and line 111 to indicate a driving path as shown in FIG. 1, and the path of the gripper icon 216 in FIG. 2E, respectively. It becomes further apparent that the interaction can be conceptually simplified by having the points directly refer to where the robot is needed to move and to use a noun-verb interaction grammar to describe the uses of the geometric references. That is, have the user sketch and describe actions rather than sketch scene geometry to provide input to an automated planner.

Figure 6:
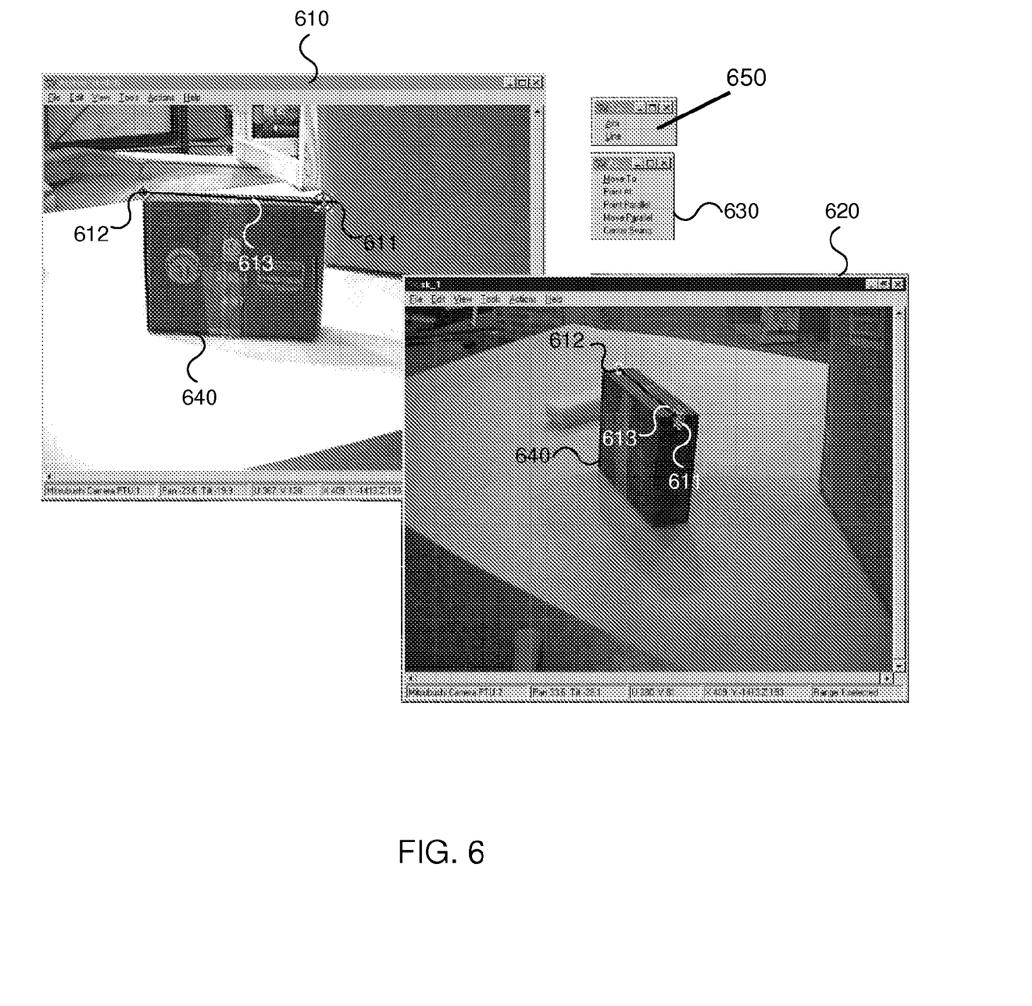
FIG. 6 is a screen illustrating an exemplary active sketch interface in accordance with various exemplary embodiments of the present invention.

The resulting HMI system in accordance with various alternative exemplary embodiments of the present invention is illustrated in FIG. 6. The Action menu 630 is shown in the main interface and, for example, the ability to sketch lines, made by connecting two icons or points such as icons 611 and 612 in window 610. The images in windows 610 and 620 show how a user can generate aim and range icon pairs as well as lines from connected pairs of aim and range icons. Action menu 630 shown in a torn off mode, allows a user to select several conceptual actions such as Move To, Point At, Point Parallel, Move Parallel, and the like.

An extended set of grammars can be used in accordance with various exemplary embodiments of the present invention to describe actions that can be performed by robots or machines on geometric entities as described in Table 1 hereafter. These actions provide a user with a very compact yet expressive way to command a machine or robot to perform a variety of tasks. An interface can be used to create an interaction grammar, with points and lines forming the nouns of the grammar and actions forming the verbs. For example, selecting a line and a "point parallel" action might command the robot or machine to align its tool to point in the same direction as the line. Conversely, selecting an "align with" action (not shown), might command the robot to rotate the tool to point in a direction perpendicular to the tool. Finally, selecting a point and the "move to" action might move the robot to the point without changing the tool's orientation while selecting a line and the "move to" action might command the robot to move and reorient the robot's tool.

TABLE 1

| Geometric Entity | Action Verb | Meaning |
|---|---|---|
| Point | Move To | Move the robot's tool to the point while maintaining the robot tool's current orientation |
| Line | Move To | Move the robot's tool to the head of the line while changing the orientation to point the approach axis along the line |
| Point | Grab | Same as Move To |
| Line | Grab | Move the robot's tool to the center of the line while changing the orientation to be perpendicular with and aligned along the major axis with the line, e.g. move the robot so that its gripper straddles the line |
| Point | Point at | Reorient the robot so that its tool is pointing at the indicated point. |
| Line | Point at | Reorient the robot so that its tool is pointing parallel to the line. |

TABLE 1-continued

| Geometric Entity | Action Verb | Meaning |
|---|---|---|
| Point | Point Parallel | Reorient the robot so that its tool is pointing parallel to the line formed between the aiming camera and the point, e.g. point in the same direction as the aiming camera. |
| Line | Point Parallel | Reorient the robot so that its tool is pointing parallel to the line. |
| Point | Align | Reorient the robot so that its tool is perpendicular to the line formed between the aiming camera and the point, e.g. a gripper would point to straddle the line. |
| Line | Align | Reorient the robot so that its tool is pointing perpendicular to the line. |
| Point | Move Parallel | No effect. |
| Line | Move Parallel | Move the tool parallel to the line. |

For example, a great number of the tasks that bomb squad and similar robot users need to perform can be reduced, due to the expressiveness of the noun-verb icon-action grammar, into simple icon-action sentences. The compactness of the icon-action grammar and language leads to rapid learning and increased fluency flowing from experience.

Figure 7:
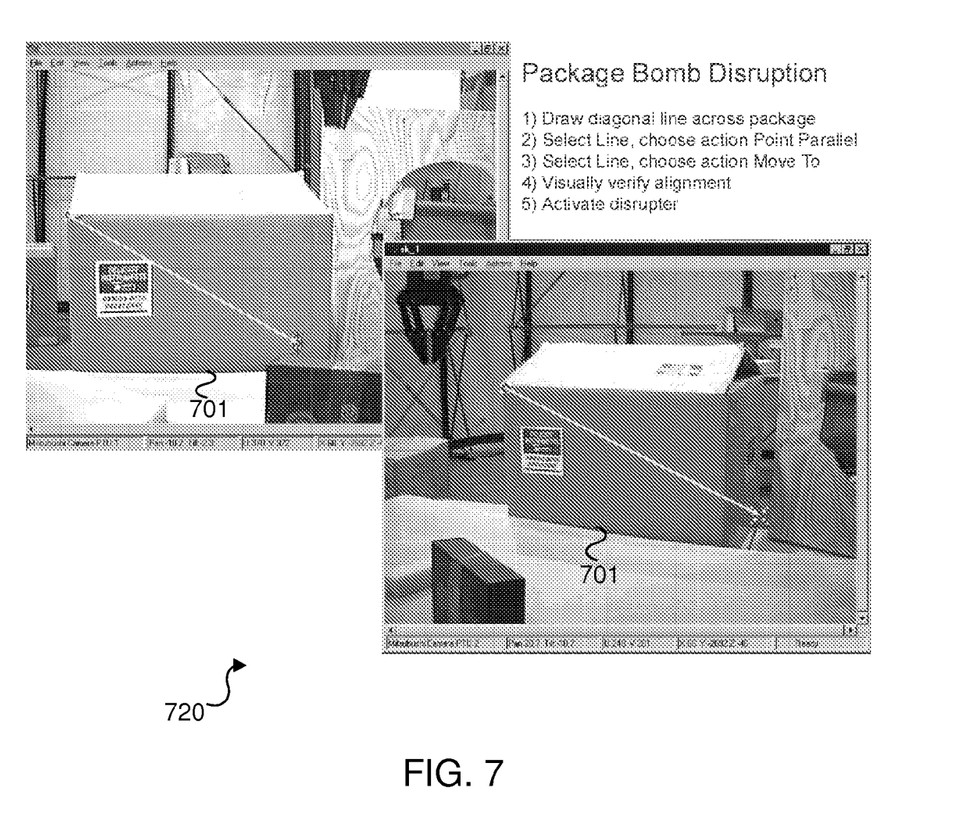
FIG. 7 is a diagram illustrating an exemplary instruction sheet in accordance with various exemplary embodiments of the present invention.

A practical implementation of concepts in accordance with various exemplary embodiments of the present invention, e.g. driving an interface from sketches, utilizes pre-built sketches as both language examples and pre-built grammatical constructs that can be quickly modified to address new needs. A simpler example includes cataloging screen images of properly configured scenes with appropriate instructions in a sketch notebook and the like. FIG. 7 is an example of such a catalog or notebook including instruction sheets that might be used by bomb squad disposal technicians.

Window 720 illustrates actions that can be described using the Human Machine Interface in accordance with the present invention to, for example, disrupt a potential bomb associated with box 701. A diagonal line can be drawn across box 701. The diagonal line can then be selected and a "point parallel" action selected for alignment. The line can be selected again and a "move to" action selected. Using the visual interface within the HMI, the alignment can be verified and, for example, a disruption device such as a detonation charge or projectile deployed from a tool associated with the machine or robot.

Thus in accordance with various exemplary embodiments of the present invention, a user using the HMI can interact with sketches to program a machine or robot. The operator preferably modifies pre-built sketches representing best practices into sketches describing an operational situation. Icon or sketch element placement can accordingly be constrained with respect to one or more camera perspectives, with robot commands preferably represented as sketch elements forming nouns and action menu commands forming verbs of a grammar. Thus, high-level interface technologies can be merged with teleoperation modalities, and the use of a sketch notebook to inform and preprogram sketch sequences that execute programs used to direct machine or robot action.

The sketch notebook includes one or more tasks described as one or more icons (nouns) overlaying a predetermined view and one or more commands (verbs) associated with the one or more icons to complete the one or more tasks. Those skilled in the art will appreciate that the predetermined view can be any view that is usable for illustrating the task to be completed. For Example, the predetermined can contain a sketch an automobile door (e.g., as illustrated in FIG. 2E).

Alternatively, 3D models, captured images, and the like could also be used for the predetermined view so long as it is appropriate for illustrating the task (e.g., showing the pipe to be grabbed, the door to be opened, etc.). Additionally, the tasks can be nested to form even higher level task functionality, which can also be stored in the sketch notebook and combined with text instructions to aid in accomplishing the stored tasks as described above.

Drawing can further be accomplished in 3D using two or more viewpoints that directly map to camera-based images. Geometry and action commands can be accessed in an HMI and robot trajectories generated and constrained by introducing camera frame coordinate space constraining a machine or robot's dominant motion coordinate frame to be along a spherical coordinate frame centered on a camera. Real time user control over commands generated from a high-level or supervisory control system can further be provided and high-level task plans can be re-used with instructions provided to the user.

Figure 8:
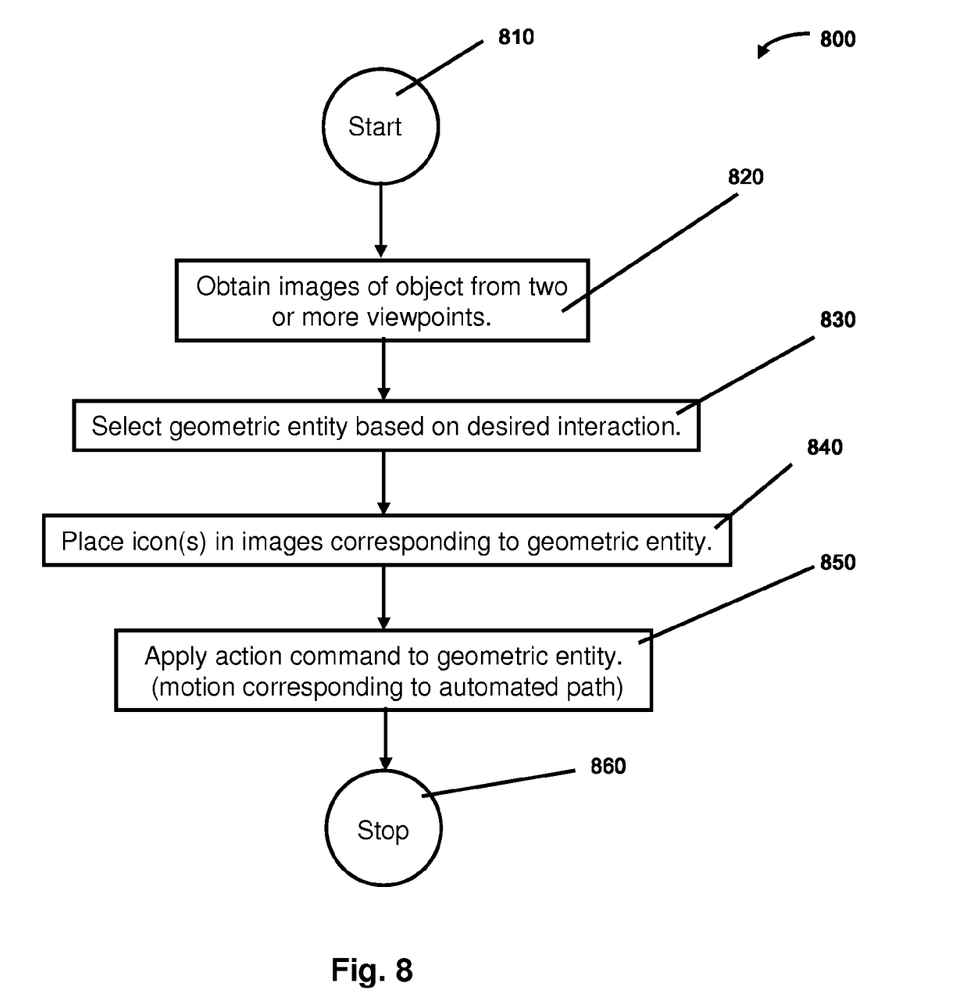
FIG. 8 is a schematic block diagram of an embodiment of a method according to the present invention.

FIG. 8 is a schematic block diagram of an embodiment of a method according to the present invention. FIG. 8 serves to illustrate the various embodiments of the invention as described above in FIGS. 1-7. The method starts at step 810. A description of the steps comprising the method in FIG. 8 follows, with reference to the images of FIG. 6 as an illustrative example. In FIG. 6, it is desired to have a robotic tool (e.g. a robotic arm) interact with an object 640. In this example, one option for the interaction is to have the robotic arm point a tool at the top edge of the object 640. The operator uses the methods of the invention to quickly define the position of a line along the top edge of the object 640 (i.e. in the 3D environment) and applies an action command causing motion of the robotic arm to point the tool at the defined line. The motion of the robotic arm is controlled by a system planner, e.g. an automated path planner, as described above.

At step 820, two (or more) images 610 and 620 are obtained of object 640 from separate viewpoints. As described above, the images 610 and 620 are acquired with calibration data defining each images point of origin and a mathematical correspondence or correlation using the calibration data is established so that each point or pixel in one camera image projects as a line or curve in the other image.

At step 830 an operator selects a geometric entity corresponding to a desired interaction of the robotic arm with the object 640. A list 650 of available geometric entities is provided to the operator to select from. In this example, the operator has selected "line" as the geometric entity. Geometric entities can comprise points (e.g. one icon) lines (e.g. two connected icons) and planes (e.g. three connected icons) as represented in images 610 and 620 and, the selected geometric entity corresponds to a set of action commands defined for each geometric entity as presented in Table 1. As described above, action commands cause motion of the robotic element according to a predetermined path, generated by the system planner. In this example, by having selected the line geometric entity, the operator has the options of selecting action commands from the list 630 including, "move to", "point at", "point parallel", "move parallel" and "center swing".

At step 840, as the operator has selected the line geometric entity, two icons 612 and 611 connected by a line 613 are placed in image 610. The operator can position the icons 611 and 612 in image 610 along the top edge and at the ends of the object 640. Projections (i.e. epipolar lines) of the locations of the icons 611 and 612 in image 610 are computed for image 620 and the locations of the icons 611 and 612 are displayed in image 620, constrained to exist along the epipolar projections (not shown) for image 620. The operator can adjust the location of the icons 611 and 612 in image 620 to align to the ends of the object 640 in image 620, but as described above, this adjustment does not effect the location of the icons 611 and 612 as viewed in the image 610, due to the epipolar constraint. By adjusting the location of the icons 611 and 612 in the two images in this manner, an operator can quickly and easily define the location of the line 613 in the 3D environment, base upon the mathematical correspondence described above.

At step 850, the operator can select the line geometric entity 613 in image 620 and apply an action command, selected from the list 630, to the line 613. In this example, the operator can select the action command "move parallel" which would cause the robotic arm to automatically move and reorient the robotic arm so that its tool is pointing parallel to the line. The system planner would automatically generate the necessary control commands to re-orient the joints of the robotic arm to bring the tool into a position parallel to and pointing at the line geometric entity. The examples presented above in FIGS. 2A through FIG. 3, illustrate re-orientation of a robotic arm under control of a system planner.

The embodiment of the method ends at step 860.

The foregoing illustrates the principles of the invention. It will be appreciated by those skilled in the art will that various arrangements of the present invention can be designed. For example, the functionality performed by the processor can be one or multiple processing devices or can be performed in software in a related processing system (e.g., a robot controller). Therefore, the scope of the invention is not limited by the foregoing description but is defined solely by the appended claims.

What is claimed is:

1. A Human Machine Interface (HMI) for directing motion of an element relative to an object in a 3D environment using a graphical interface, the HMI comprising:
   a display operatively configured to display the object in a first image observed from a first viewpoint and a second image observed from a second viewpoint, the first and second viewpoints having know coordinates within a coordinate system of the 3D environment;
   an input device operatively configured to:
     select a geometric entity based upon a desired interaction of the element with the object, the geometric entity selected from the group consisting of a point, a line and a plane; and,
     establish a number of icons at locations in the first image, the number of the icons determined by the geometric entity selected, the icons delineating the geometric entity as viewed in the first image, the locations of the icons in the first image corresponding to the object as viewed in the first image; and,
   a processor coupled to the display and the input device, the processor operatively configured to:
     calculate for the second image, projections of the locations of the icons in the first image, the projection of each location of an icon in the first image comprising an epipolar line in the second image;
     generate the first image having the icons placed at their respective locations in the first image and, generate the second image having the icons placed at their respective locations in the second image thereby delineating the geometric entity in the second image; and,
     determine a constraint, whereby the respective locations of icons in the second image are constrained to exist along their respective epipolar lines and, wherein movement of an icon along its corresponding epipolar line in the second image, does not change the location of the icon as viewed in the first image.

2. The Human Machine Interface (HMI) of claim 1 wherein the processor is further configured to:
   apply an action command to the geometric entity in the second image; and,
   generate control commands including a trajectory and a velocity to direct the element in the 3D environment toward a primary goal.

3. The Human Machine Interface (HMI) of claim 2 wherein the processor is further configured to:
   adjust the motion of the element if a satisfactory goal is reached before the primary goal by using an input device with one of at least two linear and three digital degrees of freedom.

4. The Human Machine Interface (HMI) of claim 3 wherein the input device is at least one of three buttons, a lever-dash pot, a mouse and a joystick.

5. The Human Machine Interface (HMI) of claim 4 wherein adjusting the motion of the element includes the ability to move along the trajectory with a negative velocity, thereby enabling element back up control.

6. The Human Machine Interface (HMI) of claim 1 wherein the processor is further configured to:
   describe one or more tasks as one or more geometric entities overlaying an image; and,
   associate one or more commands with the one or more icons to complete the one or more tasks.

7. The Human Machine Interface (HMI) of claim 6 further comprising:
   a storage device for storing the one or more tasks for retrieval and modification of the one or more tasks.

8. The Human Machine Interface (HMI) of claim 6 further comprising:
   a VCR type control for controlling the one or more tasks.

9. The Human Machine Interface (HMI) of claim 8 wherein the VCR type control comprises:
   a forward button for stepping through a task in a forward sequence;
   a reverse button for stepping through a task in a backward sequence; and,
   a pause button for stopping a pending task operation.

10. The Human Machine Interface (HMI) of claim 9 wherein the VCR type control further comprises:
    at least one auxiliary button directed to specific functionalities of a device being controlled.

11. The Human Machine Interface (HMI) of claim 8 wherein the VCR type control is activated when the one or more tasks is retrieved.

12. The Human Machine Interface (HMI) of claim 1 further comprising first and second image acquisition devices to acquire the first and second images respectively.

13. The Human Machine Interface (HMI) of claim 1 wherein an icon represents at least one of a component of a robot, a machine that can move in at least three axes, and a virtual object that is movable in at least three axes in the 3D environment.

14. The Human Machine Interface (HMI) of claim 1 wherein the processor is further configured to:
    establish additional icons that are used in combination with the number of icons to define at least one of directed motion, alignment lines, and motion limit points.

15. The Human Machine Interface (HMI) of claim 1 wherein the processor is further configured to:
    selectively transition between automatic motion control, telerobotic control, and teleoperation, based upon user input.

16. The Human Machine Interface (HMI) of claim 15 wherein telerobotic control moves the element in real time corresponding to movement of an icon in the second image and wherein element motion is controlled as trajectories defined by the movement of the icon in the second image with user-controlled velocity.

17. The Human Machine Interface of claim 1 wherein the processor is further configured to display one or more epipolar lines in the second image.

* * * * *